United States Patent [19]

Buchas

[11] Patent Number: 4,490,654

[45] Date of Patent: Dec. 25, 1984

[54] CONTROL CIRCUIT FOR VIBRATORY DEVICES

[75] Inventor: Gerald L. Buchas, Bristol, Conn.

[73] Assignee: The Arthur G. Russell Company, Incorporated, Bristol, Conn.

[21] Appl. No.: 503,028

[22] Filed: Jun. 10, 1983

[51] Int. Cl.[3] .............................................. H02K 33/02

[52] U.S. Cl. ...................................... 318/130; 318/132

[58] Field of Search ............... 318/114, 124, 125, 130, 318/132, 812, 345 C, 345 G

[56] References Cited

U.S. PATENT DOCUMENTS

| | | | |
|---|---|---|---|
| 2,297,084 | 9/1942 | Swallow | 318/132 X |
| 3,122,690 | 2/1964 | Dion et al. | 318/128 |
| 3,826,993 | 7/1974 | White | 318/130 X |
| 3,840,789 | 10/1974 | Dion | 318/128 |
| 4,152,758 | 5/1979 | Bailey et al. | 318/345 G X |
| 4,220,900 | 9/1980 | Mintz | 318/447 X |
| 4,291,258 | 9/1981 | Clark et al. | 318/124 |

FOREIGN PATENT DOCUMENTS

| | | | |
|---|---|---|---|
| 2430827 | 3/1980 | France | 318/114 |
| 2489615 | 3/1982 | France | 318/114 |
| 1263718 | 2/1972 | United Kingdom | 318/124 |
| 783936 | 11/1980 | U.S.S.R. | 318/114 |

*Primary Examiner*—Stanley J. Witkowski
*Assistant Examiner*—Bentsu Ro
*Attorney, Agent, or Firm*—McCormick, Paulding & Huber

[57] ABSTRACT

A vibratory amplitude controller for vibratory mechanisms such as a vibratory feeder having in addition to a parts container, an electromagnetic drive unit operated from an A.C. current source for imparting oscillatory motion to the parts container. The controller includes a sensing means for sampling the electromagnetic drive unit current during a specific predetermined interval each A.C. current cycle to produce a vibratory amplitude representing signal. Means responsive to the vibratory amplitude representing signal controls the amount of power delivered from the A.C. current source to the electromagnetic dive unit to maintain a desired vibratory amplitude under varying load and A.C. line voltage conditions.

10 Claims, 12 Drawing Figures

CONTROL CIRCUIT FOR VIBRATORY DEVICES

BACKGROUND OF THE INVENTION

This invention relates generally to electronic control circuits and deals more particularly with an improved vibratory amplitude controller for electromagnetically driven vibratory mechanisms such as vibratory feeders.

Vibratory feeders generally include bowls, bins, hoppers, or transport rails which are vibrated to cause or facilitate movement of a plurality of parts in a smooth, substantially uniform manner in a desired direction, and perhaps in a desired orientation. The movement of parts in such feeders is accomplished by oscillating a part supporting member, such as a bowl, in a path having vertical and horizontal components. In the case of a bowl feeder, the parts move up a spiraling inclined ramp, provided about the inner periphery of the bowl, from the bottom of the bowl to a discharge outlet generally located along the upper rim. Part orienting means may be utilized to align the parts in a desired manner to facilitate, for example, subsequent handling or packaging of the dispensed parts.

An electromagnetic drive unit may be provided to impart the vibratory motion to the bowl or other parts supporting member and it is often controlled in an attempt to cause the parts supporting member to vibrate at such an amplitude and frequency as to produce a desired parts feed rate. In connection with such control it is usually desirable to maintain a constant vibratory amplitude under varying load conditions such as those which occur as parts are dispensed from the feeder or when the bowl or other parts supporting member is refilled; that is, the vibratory amplitude should not increase or decrease as a result of changes in the vibrated mass, thereby maintaining the desired parts or product feed rate constant. Since the electromagnetic drive unit is generally operated from an electrical A.C. power source, variations in the A.C. input line voltage also may cause vibratory amplitude variations.

Vibratory apparatus control circuits, such as those illustrated and described in U.S. Pat. No. 3,122,690, assigned to the same assignee as the present invention, have been used to provide a means for automatically controlling vibratory amplitude variations under varying load conditions by controlling the amount of current supplied to the electromagnetic drive unit. Often these circuits are of the phase-shift control type having servo amplitude control using transducer means mechanically connected to the vibrating portion of the apparatus to sense the vibratory amplitude and provide a feedback signal to the control circuit tending to maintain a constant vibratory amplitude.

One drawback to the aforementioned vibratory amplitude control circuits of the prior art is the use of an external transducer connected to the vibratory apparatus for sensing the vibratory amplitude. Typically transducers, for example, ones using phototransistors or light emitting diodes, are fragile, adversely influenced by dirt and other environmental conditions and susceptible to breakage. Another drawback is the additional wiring required from the controller to such a transducer.

Some control systems are manually operable to adjust the vibratory amplitude to compensate for changes in container weight, A.C. input line voltage, temperature and conditions having an influence on the amplitude. But such manually controlled systems require constant operator attention to maintain a desired feed rate. Further, a tendancy of operators is to turn the amplitude control to full value regardless of the resulting apparatus performance or risk of damage to the product. Such operation creates a condition of potential overstressing of the vibratory apparatus component parts and increases power consumption which is energy, wasteful and inefficient.

One amplitude limiting arrangement aimed at overcoming some of the aforementioned problems, illustrated and described in U.S. Pat. No. 3,840,789, assigned to the same assignee as the present invention, uses a photoelectric transducer having a light source spaced from the light sensitive surface of a phototransistor and mounted on the fixed portion of the vibratory apparatus. A vane is mechanically connected to the movable portion and is positioned to interrupt the light beam to provide a feedback signal to limit the vibratory amplitude to a predetermined magnitude. Initial adjustment and alignment of the vane relative to the sensitive surface and subsequent replacement or servicing of the phototransistor and light source is difficult since the photoelectric transducer is often mounted in a relatively inaccessible location.

Accordingly, it is desirable to have a vibratory amplitude controller for use with vibratory mechanisms that maintains a constant vibratory amplitude under varying load and A.C. line input voltage conditions and that avoids the drawbacks of the aforedescribed controllers.

A general object of the present invention is to provide an improved vibratory amplitude controller for electromagnetic drive units used in vibratory feeders that overcomes the limitations of previously used vibratory amplitude control systems. The controller of the present invention is reliable, does not use additional external transducers, provides automatic drive compensation for changes in A.C. input line voltage, container weight and the like and is compatible with various vibratory feeder electromagnetic drive units.

Other objects and advantages of the invention will be apparent from the following written detailed description and from the accompanying drawings.

SUMMARY OF THE INVENTION

The invention resides in a vibratory amplitude controller for a vibratory mechanism having in addition to a parts container or other parts supporting member, an electromagnetic drive unit operated from an A.C. current source for imparting oscillatory motion to the parts supporting member. The controller comprises sensing means for sampling the electromagnetic drive unit current during a specific predetermined interval each A.C. current cycle. Further, a means responsive to the sampled drive unit current is provided for controlling the amount of A.C. power supplied from the A.C. current source to the electromagnetic drive unit to maintain a desired vibratory amplitude.

DETAILED DESCRIPTION

Figure 1:
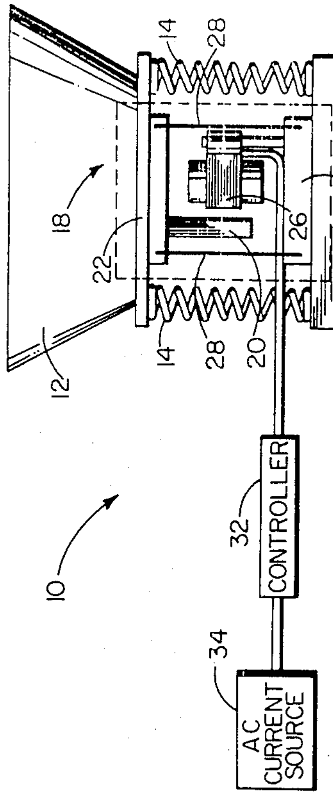
FIG. 1 shows a diagrammatic representation of an electromagnetically driven vibratory apparatus having a vibratory amplitude controller embodying the present invention.

Referring now to FIG. 1, an electromagnetically driven vibratory mechanism of the vibratory feeder type using a vibratory amplitude controller embodying the present invention is shown generally by the numeral 10. The vibratory amplitude controller 32 is shown connected to an A.C. current source 34 and functions to control the amount of A.C. power supplied to an electromagnetic drive unit 18 in response to a feedback signal representative of the vibratory amplitude. The vibratory amplitude feedback information is derived by sensing the electromagnetic drive unit current and sampling the current during one portion of each A.C. current cycle.

Still referring to FIG. 1, the vibratory feeder 10 includes a parts container 12, such as a bowl, supported by springs 14, 14 attached to a base 16. The electromagnetic drive unit shown generally at 18 includes two end plates 22, 24, an armature 20 attached to one end plate 22 which is attached to the container 12 and an iron core coil 26 attached to the other end plate 24 which is fixed to the base 16. Flexible spring plates 28, 28 attached to the end plates in a parallel spaced relationship permit one end plate to move relative to the other while maintaining the end plate in substantially parallel relationship during the movement. The electromagnetic drive unit 18 imparts oscillatory movement to the container 12 in a well known manner; that is, the coil 26 is energized by a pulsating current which, for example, may be a 60 Hertz alternating current which is rectified to provide pulsating direct current whereby the coil 26 is alternately magnetized and demagnetized. The armature 20 will be attracted to the iron core coil 26 during the energizing of the coil and since the armature is attached to the container 12 the latter will move relative to the base 16. This movement is permitted by the spring plates 28, 28 which are flexed from their normally straight position during such movement and provide the force for returning the armature 20 toward its original position when coil 26 is deenergized.

Figure 2:
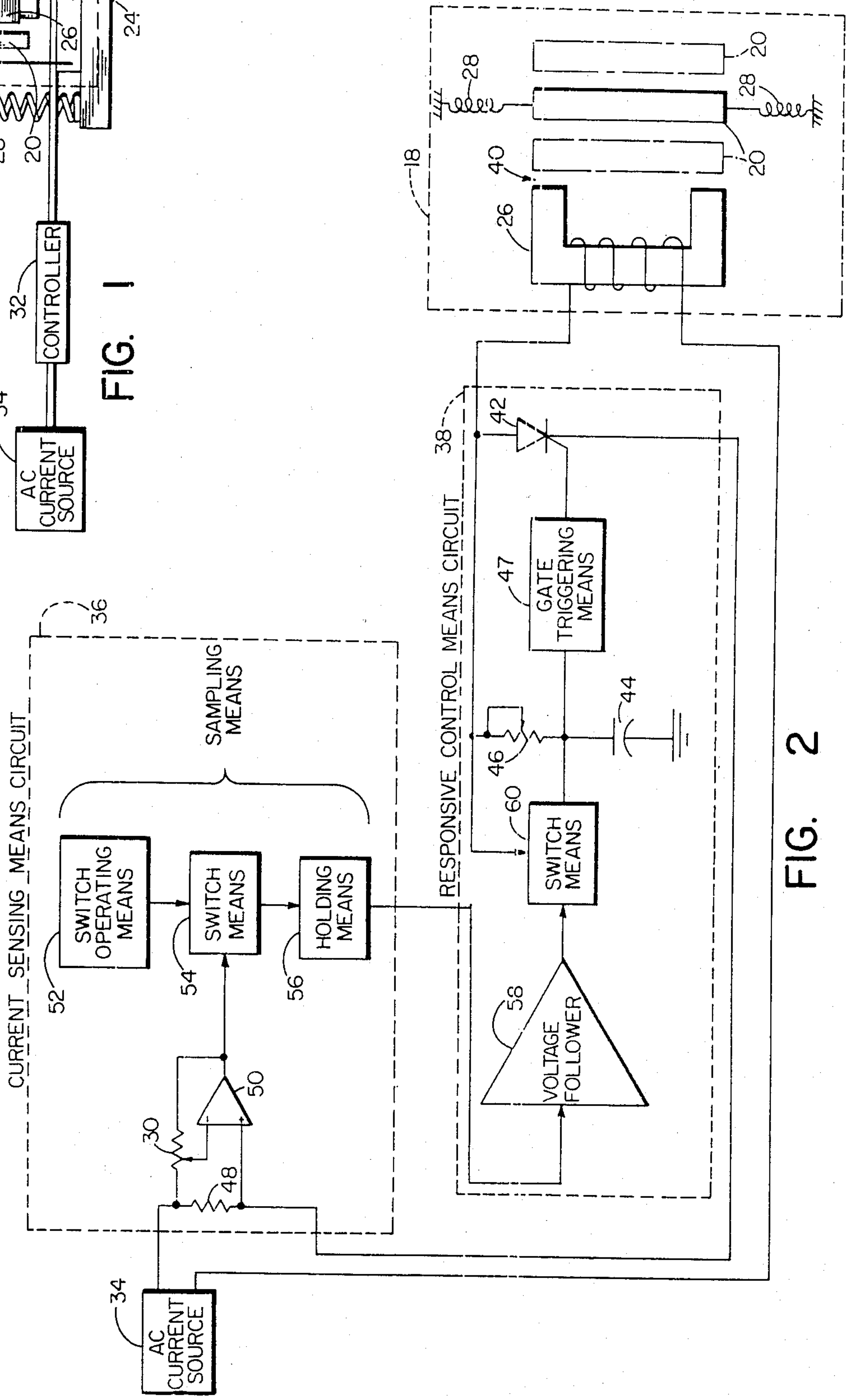
FIG. 2 is a diagram, partly in block form and partly in schematic form, of the vibratory amplitude controller of FIG. 1.

Now turning to FIG. 2, this figure shows partly in block diagram form and partly in schematic form the circuitry of the vibratory amplitude controller of FIG. 1 connected to the electromagnetic drive unit 18. The controller is comprised of a current sensing means circuit 36, the A.C. current source 34 and a responsive control means circuit 38 for controlling the current supplied to the electromagnetic drive unit 18.

The term A.C. current source as used in this application is defined to include commercially available 50–60 Hertz, 115–230 volts A.C. line voltage.

Considering first the electromagnetic drive unit 18 as viewed in FIG. 2, a physical gap shown generally by the numeral 40 exists between the armature 20 and the iron core coil 26. As shown, gap 40 becomes smaller as armature 20 is pulled toward the coil 26 when the coil is energized finally reaching its closest position relative to the iron core coil 26 as illustrated by the furthermost left-hand position of armature 20. When coil 26 is deenergized, armature 20 is caused to travel beyond its normal at rest position by the restoring action of the flexible springs 28, 28 until the armature 20 reaches the furthermost right-hand position at which time it will return to the at rest position. It can be seen that armature 20 will move with a reciprocating motion toward and away from the iron core coil 26 when a current is provided that alternately energizes and deenergizes the coil 26. It will also be understood that movement of the armature 20 is directly proportional to the amount of current flowing through the iron core coil 26; that is, the physical gap 40 between the armature 20 and the iron core coil 26 becomes smaller as more current is caused to flow through the coil.

It has been observed that the current flowing through the coil 26 of the electromagnetic drive unit 18 exhibits a dip during one portion of each A.C. current cycle. It has further been observed that the magnitude of the dip is inversely proportional to the physical gap 40 between the armature 20 and the iron core coil 26 and that the dip occurs at the point in time when the armature is located closest to the coil during an A.C. current cycle. Thus, the magnitude of the dip in the electromagnetic drive unit current is representative of the vibratory amplitude and can be used, as it is, to provide feedback control information, as explained in greater detail below, to control the current supplied to the electromagnetic drive unit 18 by the responsive control means circuit 38 thereby controlling the vibratory amplitude.

Still referring to FIG. 2, the responsive control means circuit 38 uses an SCR 42 connected in series with the coil 26 and the A.C. current source 34 to supply A.C. power to the electromagnetic drive unit 18. When current is initially applied to the circuit, a charging current flows from the A.C. current source through a variable resistance 46 to charge a timing capacitor 44. Gate triggering means 47 causes SCR 42 to become conductive, as explained in greater detail below, when the voltage across timing capacitor 44 reaches a predetermined value. When SCR 42 conducts the full value of the A.C. current source 34 is supplied to the coil 26. The current sensing means circuit 36 has a resistor 48 in series with the electromagnetic drive unit current path created when SCR 42 conducts to develop an electromagnetic drive current representing voltage. A variable gain amplifier 50 connected in parallel with resistor 48 amplifies the current representing voltage for sampling during a specific predetemined interval of each A.C. current cycle. A switch operating means 52 causes a switch means 54 to connect the output of amplifier 50 to a voltage holding means 56 during the time that the dip occurs in the A.C. current cycle. Thus the dip magnitude voltage level is stored in the voltage holding means 56 when the switch means 54 disconnects the output of voltage amplifier 50 from the holding means. A voltage follower 58 connected to voltage holding means 56 cooperates with switch means 60 during the positive half of the A.C. current cycle to precharge timing capacitor 44 with the sampled drive current representing voltage stored in the voltage holding means 56. The timing capacitor 44 then continues to charge to the predetermined value through resistor 46 as explained above. Since timing capacitor 44 is precharged with the value of the dip magnitude voltage stored in the voltage holding means 56, the time necessary to reach the predetermined value will be less than the time required when timing capacitor 44 charges through resistor 46 alone. Thus the A.C. power delivered to the electromagnetic drive unit 18 can be controlled by controlling the time required for timing capacitor 44 to charge to the predetermined value to cause gate triggering means 48 to fire SCR 42.

Before proceeding further, a brief review of SCR operating characteristics with a resistive load would be beneficial to gain a better understanding of the vibratory amplitude controller circuitry operation. An SCR is a regenerative semiconductor three terminal switch having anode and cathode terminals, and a gate terminal which controls the conduction of current between the anode and cathode. The SCR blocks current flow in both directions until a given trigger voltage is applied between the gate and cathode while the anode is positive with respect to the cathode. After sufficient forward "holding current" has started to flow through the SCR, the SCR "latches" and remains conductive until the current falls below the rated value of holding current or the anode becomes negative with respect to the cathode. When the SCR falls out of conduction, it returns to a blocking state and will not conduct until the gate is again triggered while the anode is positive with respect to the cathode.

Figure 4A:
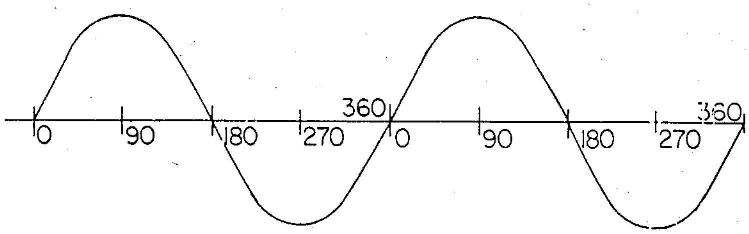
FIG. 4*a* shows a commercial A.C. line voltage waveform.
Figure 4B:
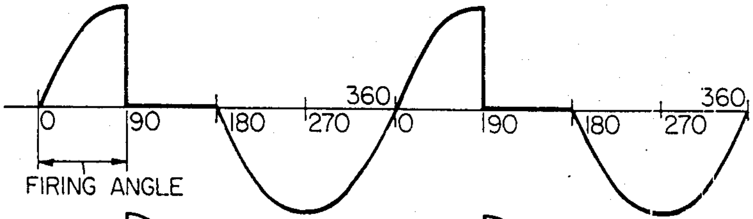
FIG. 4*b* shows a voltage waveform appearing across an SCR.
Figure 4C:
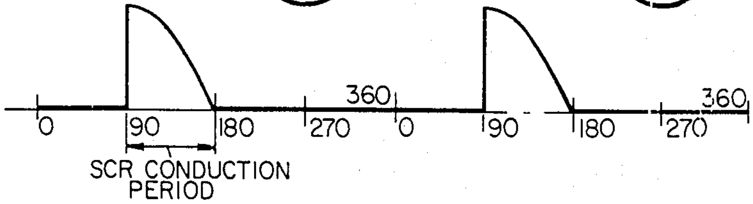
FIG. 4*c* shows a waveform of the current flowing through a resistive load connected in parallel with the SCR of FIG. 4*b*.

Referring to FIGS. 4a to 4c, a commercial 115 volt, 60 Hertz A.C. line voltage waveform is shown in FIG. 4a. FIG. 4b is a waveform illustrating the voltage appearing across the anode and cathode terminals of an SCR wherein the SCR becomes conductive at 90°; that is, a trigger voltage has been applied to the gate terminal corresponding to the time that the A.C. voltage phase angle reaches 90° in the positive half cycle. The time in the A.C. voltage cycle wherein an SCR is made to conduct by applying a trigger voltage to the gate terminal is referred to as the triggering circuit firing angle. FIG. 4c is a waveform representative of the current flowing through a resistive load connected across an SCR at the anode and cathode terminals and as illustrated, current starts to flow when the firing angle reaches 90° and the SCR begins to conduct. Conduction continues until the A.C. voltage phase angle reaches 180° at which time the anode becomes negative with respect to the cathode causing the SCR to return to a blocking state. The time interval during which an SCR is conductive is referred to as the SCR conduction angle or conduction period.

Figure 5A:
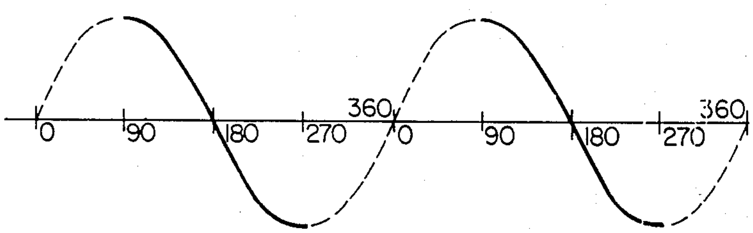
FIGS. 5*a*–5*f* show voltage, current and timing waveforms at various points in the circuit schematic of FIG. 3.

An SCR behaves somewhat differently when conducting current into a highly inductive load such as the one presented by the electromagnetic driver unit 18. The inductive nature of the iron core coil 26 opposes any change in the direction of current flow such as that which would normally occur during a transition from the positive half to the neagtive half of the A.C. line voltage cycle and produces a counter EMF in an attempt to keep current flowing in the same direction as before the change. Such a counter EMF appears as a positive voltage at the SCR anode causing the SCR to continue to conduct during a portion of the negative half of the A.C. line voltage cycle. A waveform illustrative of the current flowing through an SCR connected to a heavy inductive load is shown in FIG. 5a. The waveform of FIG. 5a assumes a triggering circuit firing angle of 90° and a 180° SCR conduction period. In other words, the SCR conducts current from 90° to 270° of the A.C. voltage cycle.

Figure 3:
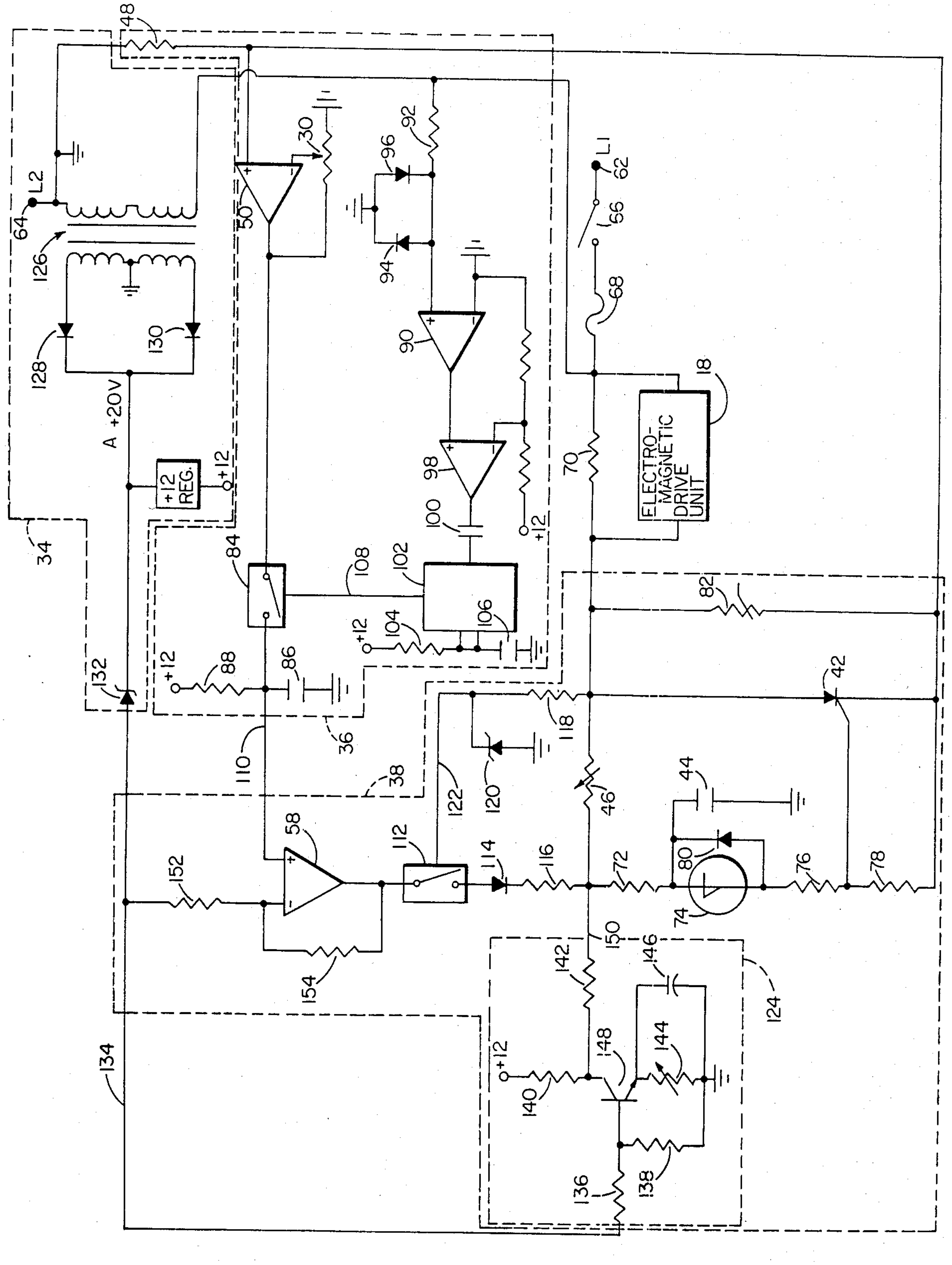
FIG. 3 is a circuit schematic diagram of the vibratory amplitude controller of FIG. 2.

Referring now to FIG. 3, the circuitry of the vibratory amplitude controller is considered in further detail. The responsive control means circuit 38 includes a typical phase-shift control SCR circuit having operational characteristics generally well understood in the art. Briefly, the SCR circuit operates in the following manner. An avalanche diode 74 acts as an open circuit until timing capacitor 44 charges to a predetermined value which value is approximately 8 volts for this circuit Upon reaching the predetermined value, avalanche diode 74 breaks down and conducts thus causing timing capacitor 44 to rapidly discharge and generate a positive trigger voltage pulse across current limiting resistors 76 and 78 which voltage pulse is transferred to the gate terminal of SCR 42 causing the SCR to conduct. Diode 80 shunts avalanche diode 74 and functions to prevent a build up of reverse voltage across the avalance diode during the negative half of the A.C. line voltage cycle to protect the avalance diode from excessive peak inverse voltages. Resistor 70 is used to augment the forward holding current of SCR 42. A Metal Oxide Varistor 82 shunts SCR 42 and functions to protect the SCR from damage due to high voltage transients and inductive spike voltages generated when the current supplied to the electromagnetic drive unit 18 is shut off.

The charging cycle of timing capacitor 44 is initiated each time the A.C. line voltage begins a positive half cycle and discharges when the predetermined breakdown voltage for avalanche diode 74 is reached some time during this positive half cycle. Timing capacitor 44 initially charges through the series circuit beginning at terminal 62 when switch 66 is operated. Charging current flows from the A.C. source at terminal 62 through switch 66, fuse 68, the parallel combination of resistor 70 and the electromagnetic drive unit 18, variable resistor 46 and resistor 72 through capacitor 44 to ground. Variable resistor 46 is adjusted during manufacture to set the charging time required for capacitor 44 to reach the predetermined breakdown voltage for avalanche diode 74. Resistor 46 is adjusted to fire SCR 42 at the latest possible time in the positive half of the A.C. line voltage cycle that provides sufficient conduction time for SCR 42 to deliver sufficient current to ensure vibratory apparatus operation. As will be explained in further detail below, timing capacitor 44 is also charged from two additional sources.

Figure 5B:
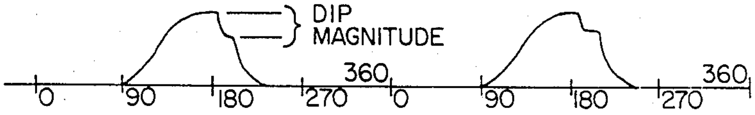
Figure 5C:
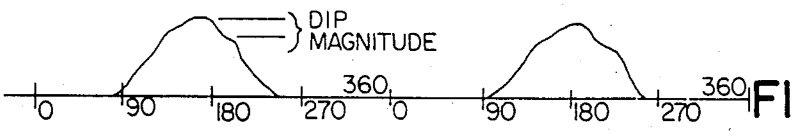

As previously mentioned, the electromagnetic drive unit current exhibits a dip during one portion of each A.C. current cycle wherein the magnitude of the dip is proportional to the vibratory amplitude. Referring now to FIGS. 5b and 5c, the current waveform representation of the electromagnetic drive unit current is illustrated wherein FIG. 5b illustrates the above referenced dip that would be observed with a high vibratory amplitude. FIG. 5c illustrates the dip in the electromagnetic current that is associated with a lower vibratory amplitude. As shown in FIGS. 5b and 5c, the dip occurs just after the electromagnetic drive unit current reaches a peak value. This peak current is also observed to occur at the point of the A.C. line voltage zero crossing as shown in FIG. 4a. Again referring to FIG. 3, when SCR 42 conducts, the A.C. line voltage is applied across the electromagnetic drive unit 18 from one side of the 115 volt A.C. voltage line at terminal 62 through switch 66, fuse 68, the parallel combination of resistor 70 and the electromagnetic drive unit 18, SCR 42 and through series resistor 48 to the other side of the 115 volt A.C. voltage line at terminal 64. As stated above, an electromagnetic drive unit current representing voltage is developed across series resistor 48. Resistor 48 is chosen to be a low ohmic value resistor to minimize the power that must be dissipated by the resistor since electromagnetic drive unit current can sometimes approach 35 amperes.

Figure 5D:
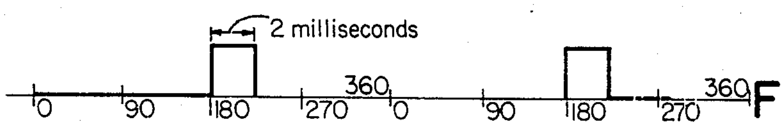

Sampling of the electromagnetic drive unit current is caused to coincide with the time the dip occurs in each A.C. current cycle for a predetermined interval of approximately two milliseconds. Sampling is initiated with the detection of the A.C. line voltage zero crossing. The non-inverting input of operational amplifier 90 is connected to one side of the A.C. line voltage through a high value resistor 92 which limits the current supplied to the input of the amplifier. Diodes 94 and 96 serve as clamping diodes to limit the input voltage to amplifier 90 and also to square up the input voltage signal. The output voltage signal from amplifier 90 is a low amplitude square wave with rising and falling edges coinciding with the A.C. zero crossing transitions. The output of amplifier 90 is fed to ampilfier 98 to produce a squarer edge voltage pulse which is more appropriate for triggering purposes. The output of amplifier 98 is coupled through capacitor 100 to a monostable multivibrator comprising a conventional 555 type timer integrated circuit 102 and timing components resistor 104 and capacitor 106. The 555 timing circuit is configured to operate as a one-shot timer and is triggered by a falling transition pulse to produce a two millisecond output pulse as illustrated in FIG. 5*d* on lead 108 which is connected to the enabling lead of an electronic switch 84. The electronic switch 84 connects the output of amplifier 50 to a holding circuit comprising capacitor 86 and resistor 88. Since the electronic switch 84 is caused to operate during the interval that the dip is present in the electromagnetic drive unit current, the current representing voltage magnitude occurring during the two millisecond sampling interval is coupled to and held by holding capacitor 86. In other words, amplifier 50 charges holding capacitor 86 during the two millisecond sampling interval to a voltage representative of the vibratory amplitude. If the dip is not present or is smaller than the immediately preceding dip, the voltage amplifier charges holding capacitor 86 to a higher voltage during the sampling interval. If the dip is greater than the immediately preceding dip, the output voltage of amplifier 50 will be less than the immediately preceding sampled voltage output and will therefore bleed off some voltage from holding capacitor 86 during the sampling interval dropping the holding voltage to a lower voltage corresponding to the voltage output currently being sampled.

In order to make the vibratory amplitude controller compatible with electromagnetic drive units having differing electrical characteristics and also to provide a means to preset the vibratory amplitude to a desired level, voltage amplifier 50 is designed as a variable gain, D.C. voltage amplifier and provides voltage gain from unity to full open loop gain through adjustment of a control potentiometer 30. Thus, amplifier 50 may be adjusted to provide a higher output voltage than the sampled current voltage to charge holding capacitor 86 to a higher level during the sampling interval to supply a higher precharge voltage to timing capacitor 44, thus firing SCR 42 earlier in the A.C. voltage cycle to increase the vibratory amplitude to a desired level.

Figure 5E:
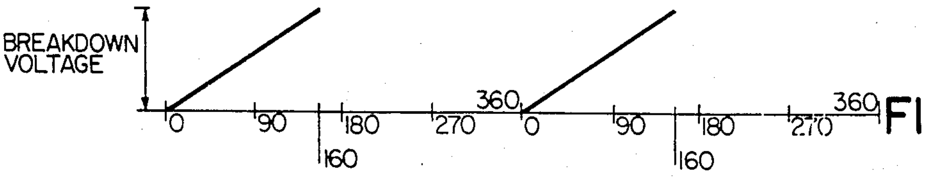
Figure 5F:
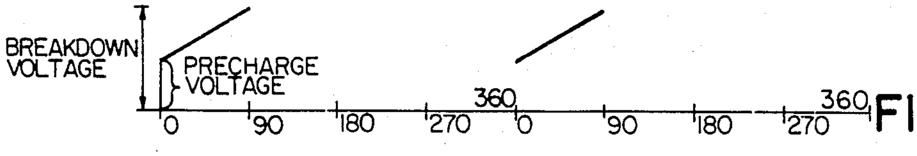

A voltage follower 58 is connected to the holding capacitor 86 and resistor 88 by lead 110. The output of the voltage follower is connected to an electronic switch 112. The electronic switch 112 is operative during the positive half of the A.C. voltage cycle when SCR 42 is held nonconductive and is enabled by a positive voltage appearing on lead 122. The enabling voltage is limited to approximately 11 volts by zener diode 120 and resistor 118 which is connected to one side of the A.C. voltage line through the parallel combination of resistor 70 and the electromagnetic drive unit 18, fuse 68 and switch 66. When electronic switch 112 is enabled the voltage appearing at the output of voltage follower 58 is transferred to the timing capacitor 44 through diode 114, resistor 116 and resistor 72 to precharge timing capacitor 44 to the value of the sampled current representing voltage. Precharging timing capacitor 44 causes avalanche diode 74 to break down and conduct at an earlier time in the positive half of the A.C. voltage cycle. This may be best illustrated by referring to FIGS. 5*e* and 5*f*. FIG. 5*e* illustrates the charging voltage on timing capacitor 44 as it would charge through the charging path including the variable resistor 46 as previously explained. The predetermined breakdown voltage is reached at some time during the positive half of the A.C. cycle. FIG. 5*e* illustrates for explanatory purposes only the timing capacitor 44 charging voltage reaching the predetermined breakdown voltage at 160 in the A.C. voltage cycle. In comparison, FIG. 5*f* illustrates the timing capacitor charging voltage reaching the predetermined breakdown voltage at an earlier point, for example 90 in the A.C. voltage cycle, due to the precharging of timing capacitor 44 with the sampled current representing voltage. It can be seen that the firing angle of the triggering circuit is controllable from the beginning of the positive half of the A.C. voltage cycle when the sampled current representing voltage transferred from the holding capacitor 86 to the timing capacitor 44 is equal to the avalanche diode 74 predetermined breakdown voltage to the latest preset firing angle that will ensure a minimum vibratory amplitude as discussed above.

Referring again to FIG. 3, a line voltage compensation circuit 124 is sensitive to fluctuations in the A.C. input line voltage above and below the nominal 115 volts and modulates the timing capacitor charging voltage to regulate the firing of SCR 42 so that the amount of power delivered to the electromagnetic drive unit 18 is sufficient to maintain a preset constant vibratory amplitude. Voltage levels above 115 volts cause excessive A.C. power to be delivered to the electromagnetic drive unit 18 for a given SCR conduction period while voltage levels below 115 volts cause insufficient A.C. power to be delivered for the same SCR conduction period. When the A.C. input line voltage is a nominal 115 volts, the half wave rectifier included in the A.C. current source 34 and comprising transformer 126 and diodes 128 and 130 provides a nominal +20 volt D.C. output at point A. The rectified D.C. voltage at point A will be greater than +20 volts D.C. for a line voltage greater than 115 volts and will be less than +20 volts D.C. for a line voltage less than 115 volts A.C. A 15 volt zener diode 132 in series with point A provides a +5 volt D.C. reference voltage on lead 134. Voltage compensation circuit 124 is an inverse feedback voltage amplifier comprised of resistors 136, 138, 140, 142, variable resistor 144 and transistor 148. The amplifier is coupled to lead 134 through resistor 136. Variable resistor 144 is adjusted at the nominal 115 volt A.C. line voltage during manufacture to produce a voltage on lead 150 which is connected to the timing capacitor 44 through resistor 72 so that no increase or decrease in vibratory amplitude occurs when the lead 150 is connected to and disconnected from the circuit. When the A.C. line voltage is greater than the nominal 115 volts, the voltage at point A will be greater than +20 volts causing the voltage on lead 134 to be greater than the reference 5 volts D.C. present with the nominal 115 volt input. The line voltage compensation circuit 124 senses the higher reference voltage and produces a lower voltage on lead 150 which effectively slows the charging time of timing capacitor 44. Since a longer time is required for capacitor 44 to charge to the breakdown voltage, SCR 42 will be fired at a slightly later time in the positive half of the A.C. current cycle. Since a higher A.C. line voltage is present, SCR 42 supplies an amount of A.C. power equivalent to that supplied when SCR 42 conducts for a longer period of time at a lower A.C. line voltage. In a similar manner, when the A.C. line voltage is less than the nominal 115 volts, the voltage appearing on lead 134 is less than the reference 5 volts D.C. In this case, the line voltage compensation circuit 124 provides a higher voltage on lead 150 to cause timing capacitor 44 to charge to the predetermined breakdown voltage at an earlier time in the positive half of the A.C. current cycle. Since a lower A.C. line voltage is present, SCR 42 delivers the equivalent amount of A.C. power that is supplied when a nominal 115 volts A.C. is present.

Voltage follower 58 also provides some degree of line voltage compensation. The inverting terminal of voltage amplifier 58 is connected to lead 134 through a large value resistor 152 to sense the fluctuations in the 5 volt D.C. reference voltage and in cooperation with feedback resistor 154 determines the amplifier gain. The sampled current representing voltage that is supplied to timing capacitor 44 as explained above will be amplified somewhat to compensate for a lower A.C. input line voltage and will be slightly attentuated to compensate for a higher A.C. input line voltage.

A vibratory amplitude controller for electromagnetically driven vibratory mechanisms such as vibratory feeders has been described in a preferred embodiment and numerous substitutions and modifications can be had without departing from the spirit of the invention. Accordingly, the present invention has been described merely by way of illustration rather than limitation.

I claim:

1. A vibratory amplitude controller for a vibratory mechanism having a parts supporting member, an electromagnetic drive unit having an iron core coil and an armature for imparting oscillatory motion to the parts supporting member, and an A.C. current source for powering the electromagnetic drive unit, said controller comprising:

sensing means for sampling the electromagnetic drive unit current during a specific predetermined interval each A.C. current cycle;

means responsive to said sample current for controlling the amount of A.C. power supplied by the current source to said electromagnetic drive unit;

said current of said electromagnetic drive unit exhibiting a dip during one portion of each of said A.C. current cycles which current dip has a magnitude inversely proportional to the physical gap existing between the armature and the iron core coil at the point of armature movement closest to said iron core coil during said A.C. current cycle, and means for causing said predetermined interval of said sensing means during which current sampling occurs to coincide with the time said dip occurs in each cycle of said A.C. current.

2. A vibratory amplitude controller for a vibratory mechanism having a parts supporting member, an electromagnetic drive unit having an iron core coil and an armature for imparting oscillatory motion to the parts supporting member, and an A.C. current source for powering the electromagnetic drive unit, said controller comprising:

sensing means for sampling the electromagnetic drive unit current during a specific predetermined interval each A.C. current cycle;

means responsive to said sampled current for controlling the amount of A.C. supplied by the current source to said electromagnetic drive unit;

said current of said electromagnetic drive unit exhibiting a dip during one portion of each of said A.C. current cycles which current dip has a magnitude inversely proportional to the physical gap existing between the armature and the iron core coil at the point of armature movement closest to said iron core coil during said A.C. current cycle;

means for causing said predetermined interval of said sensing means during which current sampling occurs to coincide with the time said dip occurs in each cycle of said A.C. current;

said sensing means comprises a resistor in series with the electromagnetic drive unit current path created when A.C. power is supplied from said current source to said electromagnetic drive unit for developing an electromagnetic drive unit current representing voltage;

voltage amplification means in parallel with said resistor for producing an amplified current representing voltage, said voltage amplification means being a variable gain, non-inverting voltage amplifier having control potentiometer means whereby the operator can adjust the vibratory amplitude to a desired level, and said sensing means further comprising sampling means, said sampling means including holding means for storing a voltage potential, first switch means for selectively connecting and disconnecting said variable gain amplifier output to and from said holding means, and switch operating means for closing said switch means during said specific predetermined interval each A.C. current cycle to transfer said current representing voltage to said holding means.

3. A vibratory amplitude controller as defined in claim 2 wherein said first switch means comprises an electronic analog switch.

4. A vibratory amplitude controller as defined in claim 2 wherein said first switch means is operative when an enabling voltage pulse is applied and said switch operating means comprises a monostable multivibrator for producing an enabling output voltage pulse having a time duration equal to said specific predetermined interval and a zero crossing detector for producing an output voltage triggering pulse to cause said monostable multivibrator to produce said enabling pulse to operate said first switch means.

5. A vibratory amplitude controller as defined in claim 2 wherein said holding means includes a resistor-capacitor series network.

6. A vibratory amplitude controller as defined in claim 2 wherein said means responsive to said sampled current comprises a phase shift controlled rectifier circuit, said rectifier circuit including a silicon controlled rectifier (SCR) having two power terminals and a gating terminal, said two power terminals being connected in series with said A.C. current source and said electromagnetic drive unit, gate triggering means for firing said SCR, said gate triggering means including a timing capacitor, means for supplying charging current to said timing capacitor said means including a second switch means having an operated position and a released position connected to said holding means and said timing capacitor for transferring said sampled drive current representing voltage to said timing capacitor and operative during the positive half of said A.C. current cycle and released during the negative half of said A.C. cycle, voltage responsive means connected to said timing capacitor and to said gating terminal and operative when the voltage across said timing capacitor reaches a predetermined value to produce a gating signal which fires said SCR.

7. A vibratory amplitude controller as defined in claim 6 wherein said means for supplying charging current to said timing capacitor further includes variable resistance means connected in series with said timing capacitor and said A.C. current source for producing a minimum charging current to insure said timing capacitor voltage reaches said predetermined value for firing said SCR to cause said SCR to deliver sufficient A.C. power to maintain a minimum vibratory amplitude.

8. A vibratory amplitude controller as defined in claim 6 wherein said means for supplying charging current to said timing capacitor still further includes circuit compensation means connected to said timing capacitor and said A.C. current source, said compensation means being sensitive to fluctuations in said A.C. current source for modulating said charging current to regulate the firing of said SCR such that the amount of A.C. power delivered to said electromagnetic drive unit is sufficient to maintain a preset constant vibratory amplitude under varying A.C. current source conditions.

9. A vibratory amplitude controller as defined in claim 6 wherein said means for transferring said sampled voltage includes a voltage follower amplifier having its non-inverting input terminal connected to said holding means and its output connected to said second switch means.

10. A vibratory amplitude controller as defined in claim 9 wherein said second switch means comprises an electronic analog switch.

* * * * *